(12) United States Patent
Richardson

(10) Patent No.: US 8,477,222 B2
(45) Date of Patent: Jul. 2, 2013

(54) METHOD AND APPARATUS FOR EXPOSURE LEVEL SETTING IN MACHINE VISION SYSTEMS

(75) Inventor: Justin Richardson, Edinburgh (GB)

(73) Assignee: STMicroelectronics (R&D) Ltd., Marlow Bucks (GB)

( * ) Notice: Subject to any disclaimer, the term of this patent is extended or adjusted under 35 U.S.C. 154(b) by 814 days.

(21) Appl. No.: 11/559,113

(22) Filed: Nov. 13, 2006

(65) Prior Publication Data

US 2007/0126922 A1 Jun. 7, 2007

(30) Foreign Application Priority Data

Nov. 28, 2005 (EP) .................................... 05270087

(51) Int. Cl.
*H04N 5/235* (2006.01)
(52) U.S. Cl.
USPC ........ 348/262; 348/221.1; 348/367; 348/295; 348/296; 348/297; 348/317; 348/364

(58) Field of Classification Search
USPC .............. 348/362, 221.1, 367, 295, 296, 317, 348/297, 364
See application file for complete search history.

(56) References Cited

U.S. PATENT DOCUMENTS

| 5,646,390 | A | * | 7/1997 | Wang et al. | 235/454 |
| 5,745,808 | A | * | 4/1998 | Tintera | 396/236 |
| 5,815,200 | A | | 9/1998 | Ju et al. | 348/229 |
| 2002/0039137 | A1 | | 4/2002 | Harper et al. | 348/207 |
| 2002/0190229 | A1 | * | 12/2002 | Nakamura et al. | 250/556 |
| 2005/0275747 | A1 | * | 12/2005 | Nayar et al. | 348/362 |
| 2005/0285971 | A1 | * | 12/2005 | Stavely | 348/364 |
| 2007/0206113 | A1 | * | 9/2007 | Nakamura et al. | 348/362 |

* cited by examiner

*Primary Examiner* — Roberto Velez
*Assistant Examiner* — Yih-Sien Kao
(74) *Attorney, Agent, or Firm* — Allen, Dyer, Doppelt, Milbrath & Gilchrist, P.A.

(57) ABSTRACT

In a solid state image sensor having a pixel array, a first frame is imaged using varying exposure times in a series of zones. The exposure time for a subsequent frame is selected from the results of the first frame, The exposure times are controlled in a rolling blade manner by controlling the number of lines between reset and readout. The sensor is particularly suited to use in bar code readers.

15 Claims, 2 Drawing Sheets

METHOD AND APPARATUS FOR EXPOSURE LEVEL SETTING IN MACHINE VISION SYSTEMS

FIELD OF THE INVENTION

The present invention relates to automatic setting of exposure levels in machine vision systems. The invention is particularly, but not exclusively, applicable to systems and devices for reading bar codes.

BACKGROUND OF THE INVENTION

In the field of bar code reading, there is increasing use of mobile readers used in roaming mode, as opposed to readers directly connected to a fixed data processing system, for example to a point of sale terminal. Roaming devices pose a number of problems.

One problem is battery capacity, and it is desirable to reduce power consumption to alleviate this. Typically the reader will be placed in a standby mode when not actively reading. When a reading is then taken, it is necessary to set the exposure level in accordance with ambient conditions; and, in prior art systems this is commonly done by taking a significant number (e.g. typically about 20) of frames of differing exposures and then selecting the best exposure for the ambient conditions. However, this number of frames leads to unnecessary power consumption and can cause problems due to movement of the reader during the process.

Another problem with roaming devices is that they are used in greatly differing ambient conditions which may range from direct sunlight to very low illumination levels within warehouses. Many designs have a default configuration in which the target is illuminated by LEDs, which consume a great deal of power. It would be desirable to disable the LEDs as quickly as possible where ambient illumination is sufficient to permit this. The above problems become even more pronounced with reading 2D symbols rather than 1D bar codes.

SUMMARY OF THE INVENTION

The present invention provides a method of setting exposure level in a solid state image sensing system, the method including: exposing a first image frame as a series of frame zones, each zone being exposed for a different length of exposure time; determining a best exposure time from the signals produced from the zones; and exposing a second image frame as a whole frame using the best exposure time.

The zones preferably comprise successive groups of rows of pixels, and the respective exposure times for the zones are set by using a rolling blade system with different time delays between reset and readout. The readout from each zone may be processed to give a statistical value of the image sensed in the zone, and the processing is preferably carried out on the same chip as the image sensor.

The best exposure time may be determined as the zone exposure time which produces the most acceptable image quality. Alternatively, the best exposure time may be determined by interpolation between zone exposure times. Preferably, the image sensed is a digital pattern image, more preferably a bar code.

From another aspect, the present invention provides a solid state image sensing device comprising an array of pixels, reset unit/means for resetting the pixels, readout unit/means for reading out pixel integrated light values, and control unit/means for producing a time delay between reset and readout of the pixels which varies between predetermined zones of the array. The device preferably includes processing unit/means on the same chip arranged to produce zone statistics from the readout pixel values of each zone.

Further, the invention provides an apparatus for reading a digital pattern, comprising a solid state image sensing device as defined above, and a lens system for forming an image of the digital pattern on the pixel array, typically in the form of a handheld mobile device for reading bar codes.

BRIEF DESCRIPTION OF THE DRAWINGS

An embodiment of the invention will now be described, by way of example only, with reference to the drawings, in which.

DETAILED DESCRIPTION OF THE PREFERRED EMBODIMENTS

Figure 1:
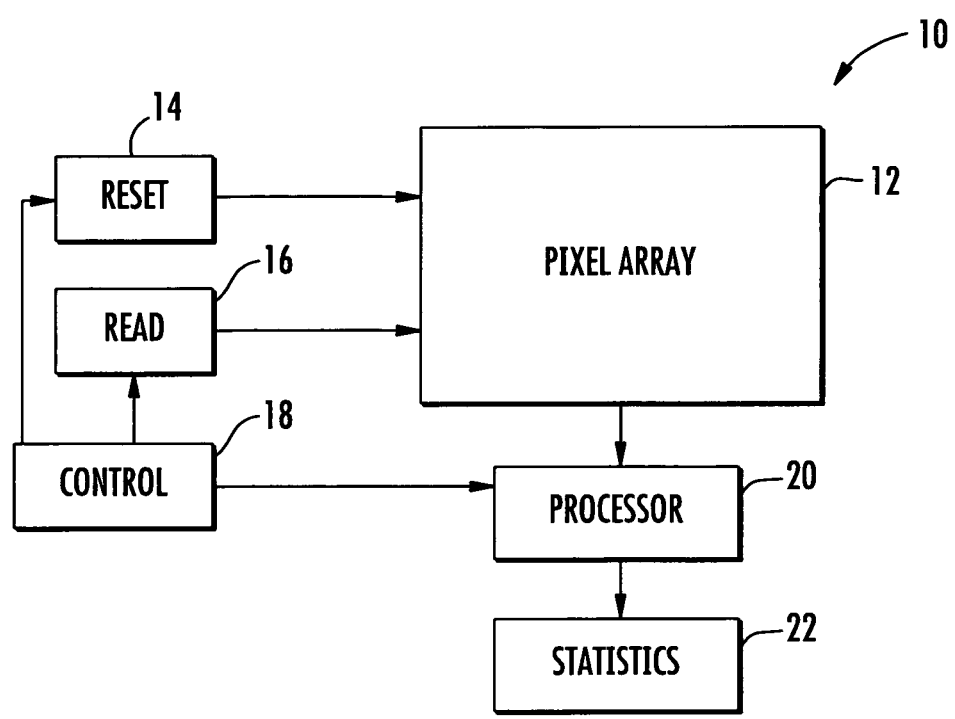
FIG. 1 is a schematic block diagram illustrating an image sensor device in accordance with an example of the present invention.

Referring initially to FIG. 1, a solid state image sensor 10 used in a bar code reader comprises a pixel array 12. In this embodiment, the pixel array 12 is a CMOS array of 3-transistor or 4-transistor type, as is well known. In principle, the invention could also be applied to other types of pixel arrays, such as a CCD sensor. The image sensor 12 also comprises a reset circuit 14 and a read circuit 16 controlled by a control circuit 18.

The control circuit 18 is operable to control the line spacing between read and reset so as to control exposure time in a "rolling blade" manner. Such operation is well known per se, but in the present invention the exposure time can be varied within each frame to divide the frame into a number of zones of varying exposure time. Preferably, the zones are of progressively increasing exposure time.

Figure 2:
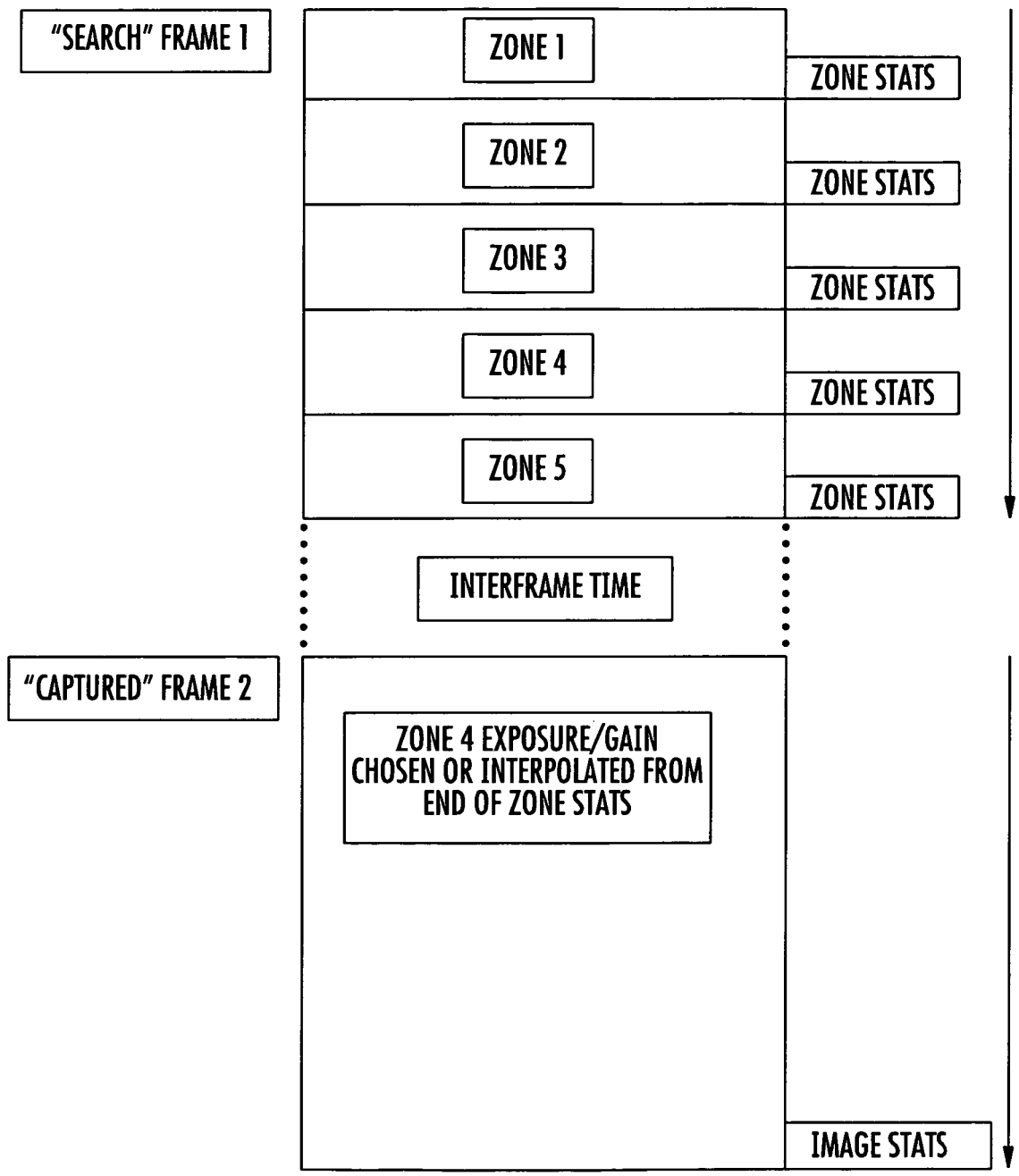
FIG. 2 is a schematic diagram illustrating the operation of one embodiment of the present invention.

Referring to FIG. 2, when the device is triggered by an external signal, a first frame, or 'search' frame, divided into five zones of increasing exposure time is taken. The readout pixel values are passed to an on-chip processing circuit 20 (FIG. 1) which is controlled to produce a statistical representation 22 of that zone.

The statistics for each zone of the search frame are then used to select an exposure setting for the subsequent frame, or 'captured' frame. This may be done by selecting the zone in the search frame which produced the best result in the search frame, and using the same exposure time in the capture frame. Alternatively, the exposure time for the capture frame may be chosen by interpolating between the two best zones in the search frame. This processing can conveniently be carried out during the normal interframe time.

The selected exposure time is then used during the whole of the captured frame. The same processing circuit may be used to process the pixel readout to decode the bar code. The sensor then reverts to a sleep mode until next triggered.

Thus, the sensor of the invention is capable of reading bar codes in only two frames, considerably reducing power consumption both in the imaging sensing circuitry itself and also in any associated illumination circuit/means.

Modifications may be made to the foregoing embodiment within the scope of the invention. For example, the processing circuitry could be embodied on a separate chip, although a single chip embodiment is preferred. Although described with particular reference to bare code readers, the invention is also potentially useful with other forms of image sensor.

That which is claimed is:

1. A method of setting an exposure time in a solid state image sensing system comprising an array of pixels, a reset unit for resetting the pixels, and a readout unit for reading out pixel values, the method comprising:
   controlling the reset and readout units for
      exposing a first image frame as a series of frame zones to generate a series of respective zone signals, each frame zone comprising successive groups of rows of pixels and being exposed for a different exposure time, with each frame zone having a progressively increasing exposure time,
      determining a best exposure time based upon the series of zone signals, and with the best exposure time including interpolation between zone exposure times of the first image frame, and
      exposing a second image frame as a whole frame using the best exposure time.

2. The method according to claim 1, wherein the respective exposure times for the zones are set using a rolling blade process with different time delays between reset and readout.

3. The method according to claim 1, wherein determining a best exposure time further comprises processing the zone signal from each zone to generate a statistical value of an image sensed in the respective zone.

4. The method according to claim 3, wherein the image sensing system includes an image sensor on a chip; and wherein the processing is carried out on the same chip as the image sensor.

5. The method according to claim 1, wherein exposing the first image frame comprises sensing a digital pattern image.

6. The method according to claim 5, wherein the digital pattern image comprises a bar code.

7. A method of setting an exposure level in an image sensing system comprising an array of pixels, a reset unit for resetting the pixels, and a readout unit for reading out pixel values, the method comprising:
   controlling the reset and readout units for
      exposing a first image frame as a plurality of frame zones to generate a series of readout values, each frame zone comprising successive groups of rows of pixels and being exposed for a different exposure level, with each frame zone having a progressively increasing exposure level,
      selecting an image exposure level based upon the series of readout values, and with the exposure level including interpolation between zone exposure levels of the first image frame, and
      exposing a second image frame using the selected exposure level.

8. The method according to claim 7, wherein the respective exposure levels for the zones are set using a rolling blade process with different time delays between reset and readout.

9. The method according to claim 7, wherein selecting the image exposure level further comprises processing the readout values from each zone to generate a statistical value of an image sensed in the respective zone.

10. The method according to claim 7, wherein exposing the first image frame comprises sensing a digital pattern image.

11. The method according to claim 10, wherein the digital pattern image comprises a bar code.

12. An image sensing device comprising:
    an array of pixels;
    a reset unit for resetting the pixels;
    a readout unit for reading out pixel values; and
    a control unit for controlling the reset unit and readout unit to
       expose a first image frame as a series of frame zones to generate a series of respective zone signals, each frame zone comprising successive groups of rows of pixels being exposed for a different exposure time, with each frame zone having a progressively increasing exposure time,
       determine a best exposure time based upon the series of zone signals, and with the best exposure time including interpolation between zone exposure times of the first image frame, and
       expose a second image frame as a whole frame using the best exposure time.

13. The image sensing device according to claim 12 further comprising a processing unit to produce zone statistics from the readout pixel values of each frame zone.

14. The image sensing device according to claim 12 wherein the device is for sensing a digital pattern image; and further comprising a lens system for forming an image of the digital pattern image on the pixel array.

15. The image sensing device according to claim 14 wherein the device is a handheld mobile device for reading bar codes.

* * * * *